United States Patent [19]

Willyoung

[11] 3,755,702
[45] Aug. 28, 1973

[54] FLOW SURGE EQUIPMENT FOR DYNAMOELECTRIC MACHINE

[75] Inventor: David M. Willyoung, Scotia, N.Y.

[73] Assignee: General Electric Company, Schenectady, N.Y.

[22] Filed: July 31, 1972

[21] Appl. No.: 276,586

[52] U.S. Cl. .................................. 310/53, 310/54
[51] Int. Cl. ............................................. H02k 9/00
[58] Field of Search .............................. 310/52–65

[56] References Cited
UNITED STATES PATENTS

| | | |
|---|---|---|
| 1,216,242 | 2/1917 | MacDonald .......................... 310/54 |
| 2,645,730 | 7/1953 | Bessiere ............................. 310/53 X |
| 2,970,232 | 1/1961 | Kilbourne ........................... 310/53 X |
| 2,999,945 | 9/1961 | Heller et al. ....................... 310/53 X |
| 3,089,969 | 5/1963 | Wiedemann .......................... 310/53 |
| 3,223,864 | 12/1965 | Munson ............................. 310/53 X |
| 3,487,242 | 12/1969 | Richardson ......................... 310/53 |

Primary Examiner—D. F. Duggan
Attorney—William C. Crutcher et al.

[57] ABSTRACT

In a dynamoelectric machine with liquid-cooled element there is provided, according to the present invention, means for forcing an increased quantity of liquid coolant through the liquid coolant system during brief periods of dynamoelectric machine transient overload as well as on a regular periodic basis. Two beneficial results are thereby obtained. First, the heat removal capability of the liquid coolant system is transiently increased permitting normal operation at higher levels of initial power density; second, the flow surge of liquid coolant tends to purge the liquid coolant system of foreign particles.

16 Claims, 1 Drawing Figure

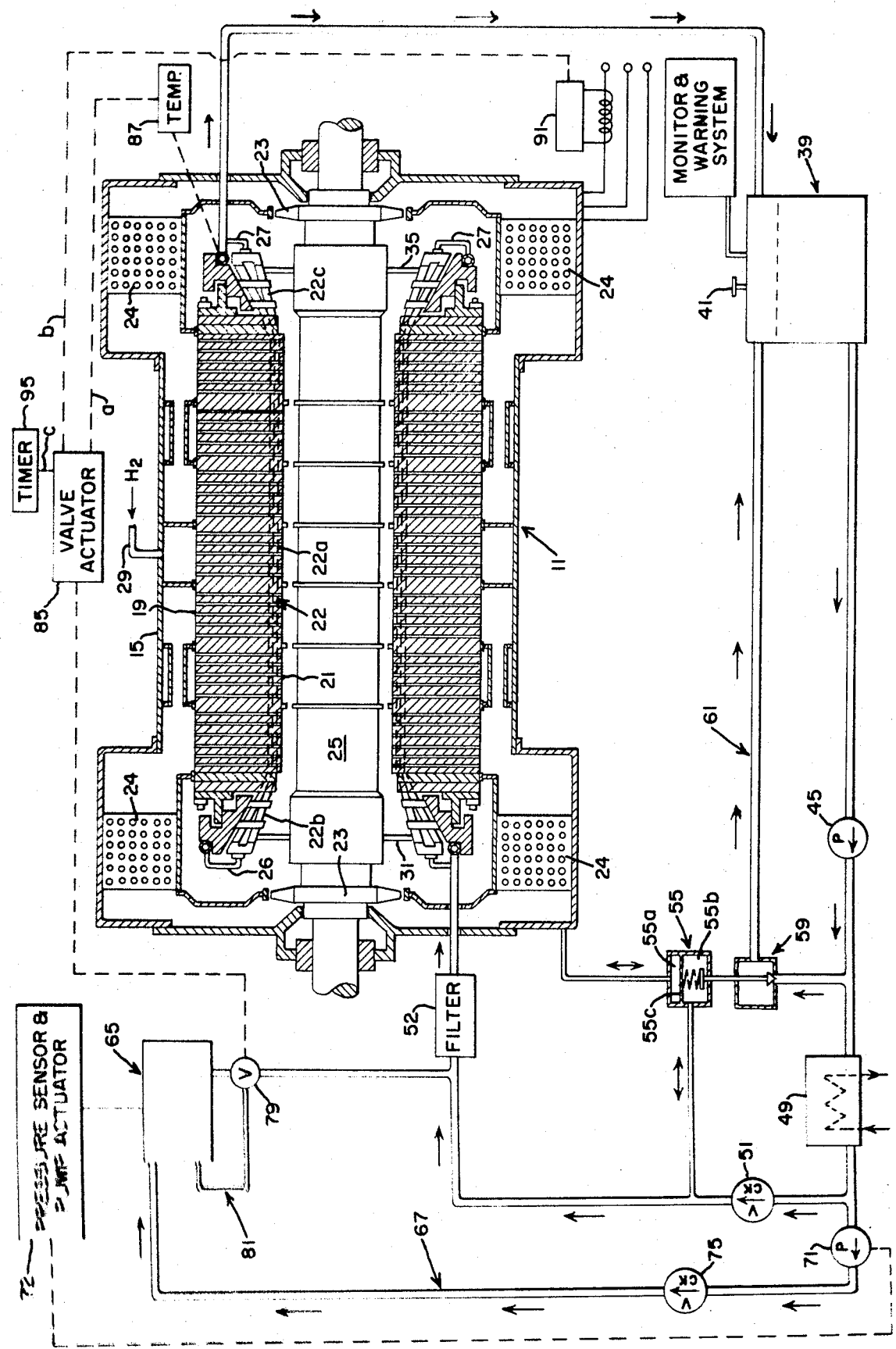

FLOW SURGE EQUIPMENT FOR DYNAMOELECTRIC MACHINE

BACKGROUND OF THE INVENTION

This invention relates to gas-cooled, liquid-cooled dynamoelectric machines; and, in particular, this invention relates to means for temporarily and intermittently increasing the volume flow of liquid coolant through the liquid coolant system.

Gas-cooled, liquid-cooled dynamoelectric machines utilize separate systems to cool different machine components. For example, large central station generators utilize hollow copper conductors cooled internally by longitudinally flowing liquid for the stationary high-voltage winding of the armature element, while the rotor windings and other parts of the electromagnetic structure are cooled by the circulation of gas which may be pressurized to several atmospheres to increase its heat removal capability.

Each component must be designed with sufficient cooling capability for safe operation for the most severe condition of operation and in accordance with the special technical limitations that are appropriate for that particular part. For the liquid-cooled armature winding, each armature conductor is composed of many separately insulated hollow strands which carry liquid in parallel hydraulically. Similarly, the armature conductors which make up the total winding are usually connected hydraulically into several parallel groups, often equal in number to the total number of armature conductors in the winding. These separate hydraulic circuits are fed and discharged by insulating, high-voltage hoses. One design requirement for the liquid-cooled winding is that vaporization or boiling never occurs within any hydraulic circuit since the resulting vapor could drastically reduce the flow in that particular hydraulic circuit, resulting in further vaporization or boiling and a runaway condition of almost total flow blockage in that particular strand or armature bar in the winding. Should such a vapor blockage occur, one conductor or strand might receive essentially no coolant flow while the other conductors continued to receive essentially their normal design quota, resulting in abnormal or dangerously high temperatures in the vapor-blocked conductor. An additional hazard from such a situation is that the vapor may collect in the insulating, high-voltage discharge hoses, breaking the liquid column and permitting high dielectric stresses to appear across the vapor-filled section of hose, with the consequent danger of local arcing which could destroy the hose integrity.

The rating of a dynamoelectric machine must take into account the possibility of transient overloads and any possible conditions of misoperation. Since vapor formation in the liquid circuit cannot be permitted, it has been necessary to design the armature winding with substantial temperature margins for the normal operating condition in order to be safe for transient overloads or misoperation. These margins can be reduced by means of the present invention which provides additional cooling capacity during brief transient overload periods by increasing the flow rate, i.e., "surging" the liquid cooling system during this period.

Vapor formation in the liquid-cooled conductors or hoses could be suppressed, of course, by continuously pressurizing the liquid cooling circuit. This is not a desirable or satisfactory solution, however, since mechanical stresses on the conductors and hoses are increased, leaks may be initiated, and in addition, the advantageous monitoring and protective system described in the next paragraph cannot be employed.

Gas-cooled, liquid-cooled dynamoelectric machines may be designed so that the liquid coolant pressure is lower than the gas coolant pressure. This arrangement lends itself to a leak detection device whereby, if a leak occurs in the liquid coolant system, gas coolant will leak into the liquid coolant system and thereafter be detected by a gas analyzer or an equivalent device and a warning will be sounded. Since the gas coolant pressure is normally higher than the liquid coolant pressure, then gas coolant will leak into the liquid coolant and not vice versa, thereby preventing serious damage to the machine. It is clear, therefore, that the above system is of considerable advantage. It is also clear that with this leak detection device, design arrangements which permit the pressure level in the liquid system to be minimized during periods of normal operation are desirable if the pressure level in the gas-cooled sections of the machine is to be minimized to reduce windage losses.

The coolant velocities in the liquid circuit will be temporarily increased when the system is "surged" causing the pressures throughout the liquid coolant system to increase as a side effect so that they may exceed the pressures in the gas coolant system. This produces a temporary loss of the normal leak detection action. However, this is of minor concern since it is only temporary and normal leak monitoring will be reinstated upon resumption of "normal" operating conditions. Furthermore, there are usually liquid sensitive monitors in the bottom of the dynamoelectric machine casing to warn of liquid leakage of any sort within the machine, and these would be actuated if extensive liquid leakage into the machine occurred during the flow surge period.

Another consideration in the design of a liquid-cooled armature winding is the steady-state velocity of the liquid passing through the hollow copper conductors. Excessive velocity maintained over a prolonged time will result in erosive destruction of the walls of the hollow copper conductor. On the other hand, as utilized in this invention, moderately higher values of liquid velocity can be employed for brief periods without significantly increasing the accumulated erosive damage to the hollow conductors.

A totally different problem in the application of hollow, liquid-cooled windings for dynamoelectric machines is that foreign particles may sometimes be present in the liquid coolant system even though the system is provided with filters. If these particles are paramagnetic, they may be held in a particular region of the hollow conductor by the magnetic fields of the machine rather than being swept through to the discharge chamber with the flowing liquid. These foreign particles may damage the liquid coolant system unless they are periodically purged from the system. The present invention may be utilized to periodically purge these foreign particles from the system.

It is therefore one object of the present invention to temporarily increase the quantity of flow of liquid coolant in the liquid coolant system of a dynamoelectric machine.

It is another object of the present invention to prevent "boiling" of liquid coolant within the dynamoelectric machine during periods of overload.

It is another object of the present invention to provide a means for purging the liquid coolant system.

Still another object is to reduce the margin that must be provided in the liquid-cooled elements of the machine to accommodate overload situations, thereby permitting the specific power density to be increased.

Other objects and advantages will become apparent from the following description of one embodiment of the invention and the novel features will be particularly pointed out hereinafter in the claims.

A system, somewhat analogous to the present invention, has been proposed in U. S. Pat. application No. 283,391, filed for Kudlacik on Aug. 24, 1972 and assigned to the assignee of the present invention. In that application, the cooling capacity of the liquid coolant system is increased by temporarily increasing the static pressure of the liquid coolant throughout the entire liquid coolant system in response to an overload sensing means. This is accomplished by pressurizing the liquid supply tank within the liquid coolant system.

SUMMARY OF THE INVENTION

In a liquid-cooled, gas-cooled dynamoelectric machine of the kind wherein the gas coolant pressure normally exceeds the liquid coolant pressure, an additional quantity of liquid coolant is held in reserve in a surge tank connected to the liquid coolant system for providing a surge of liquid coolant into the liquid coolant system in response to a sensing means or a timer provided in the dynamoelectric machine. The sensing means may be thermally or electrically responsive to dynamoelectric machine transient overload conditions and will actuate a trip valve mechanism to empty the contents of the surge tank. During the surge period, pressures in the liquid system will rise and may temporarily exceed the gas pressure. Similarly, during this period, the liquid velocities will be higher than their normal, steady-state value. However, after the trip valve mechanism has closed, the normal gas pressure to liquid pressure relation and the normal liquid velocity conditions will be reinstated. The liquid coolant surge will increase the normal heat exchange capacity of the liquid coolant system during periods of transient dynamoelectric machine overload and also act to purge the liquid coolant system of foreign particles. A scheduled liquid coolant surge can also be provided to purge the system of foreign particles on a periodic basis.

BRIEF DESCRIPTION OF THE INVENTION

The drawing is a partial schematic representation of one embodiment of a liquid-cooled, gas-cooled dynamoelectric machine with the present invention incorporated therein and the dashed lines representing electrical connections.

DETAILED DESCRIPTION OF THE INVENTION

Referring to the drawing, a gas-cooled, liquid-cooled dynamoelectric machine 11 such as a turbine-generator includes a gas-tight outer casing 15, a stator core 19 having a rotor bore 21 therethrough and a generator rotor 25 rotatably mounted within the generator casing and the rotor bore. Slots around the inner periphery of core 19 contain a polyphase armature winding 22 with slot lying portions 22a and end winding portions 22b and 22c, as is well known in the art.

The dynamoelectric machine is both gas-cooled and liquid-cooled; the gas coolant being supplied through a gas inlet 29, which may be supplied with gas (usually hydrogen), as indicated, from a gas supply tank (not shown). Gas pressure is maintained at a fixed value within casing 11 by pressure regulating equipment (not shown) and typically will be several atmospheres in excess of atmospheric pressure in order to enhance its thermal transport properties. This cooling gas is circulated through selected heat generating parts such as the rotor and the core structure of the dynamoelectric machine by shaft-mounted fans 23 and is passed through heat exchangers 24 to remove heat from the dynamoelectric machine.

The liquid coolant system is generally indicated by a pipeline flow diagram superposed over and around the aforementioned dynamoelectric machine with appropriate connections thereto. The arrows indicate the flow direction of the liquid coolant. At one end of the generator there is a liquid coolant inlet manifold ring 31 which supplies liquid coolant (from a source later described) into and through the polyphase armature winding by means of electrically insulating inlet hoses 26 and outlet hoses 27 and outlet manifold ring 35. In this embodiment, typical of large liquid-cooled, gas-cooled turbine-generators, one insulating inlet hose 26 and one insulated outlet hose 27 is normally connected to each armature winding coil in the respective end winding portions 22b and 22c so that all coils operate in parallel hydraulically although many coils may be connected in series electrically to obtain the proper output voltage level and polyphase output power.

In another embodiment of the invention, not shown, portions of the core element 19 may be cooled by liquid either singly or in addition to armature winding elements 22. A plurality of peripherally spaced liquid circuits operating hydraulically in parallel are also required in this case with the same risk of hydraulic instability between parallel flow circuits or the possibility of a drastic reduction in coolant flow in some circuits due to vapor formation which exists in armature winding 22 in the embodiment shown. Therefore, similar benefits, through the use of the present invention, will also be obtained for this embodiment.

Liquid coolant flows from the outlet manifold header 35 into a storage tank 39 which is usually about two-thirds full of liquid coolant. A gas monitoring system and warning apparatus may be connected to the storage tank above the liquid level, as shown, so as to detect gas (hydrogen) which, in the event of a leak in the liquid system inside the generator casing 15, will be entrained into the liquid stream and then will escape to the space above the liquid coolant in the storage tank. Gas monitoring and leak detection systems are well known in the art, and a representative system is shown in U. S. Pat. No. 2,675,493 issued Apr. 13, 1954 to Grobel and assigned to the assignee of the present invention. The storage tank may be opened to the atmosphere by means of a vent 41.

Liquid coolant may be passed from the storage tank by means of a main pump 45, through a heat exchanger 49 and then through a check valve 51 thus forming one source of liquid coolant supply to the inlet manifold header 31 and core 19. A suitable filter 52, demineralizer, deionizer, etc., may also be included where required. This constitutes the "normal" flow path of the liquid-cooled, gas-cooled generator.

The means by which the normal ratio of liquid and gas pressures is maintained is through a differential pressure regulator 55, an upper portion 55a of which contains gas coolant (hydrogen) bled from the generator casing; and a lower portion 55b which contains liquid coolant which is bled from the liquid coolant system. A spring biased diaphragm 55c separates the liquid and gas and is also attached to a valve 59 which may be actuated, by the raising of the diaphragm, to return excess liquid coolant to the storage tank thereby maintaining under normal operating conditions, a liquid pressure which is lower than the gas pressure. A return loop 61 is provided in connection with the valve 59. Bleeding excess liquid coolant from the liquid coolant system allows the maintenance of the desired liquid coolnat pressure.

The present invention, a liquid coolant flow surge device, includes a pressurized surge tank 65 which is normally filled with liquid coolant sufficient to handle the worst anticipated overload The surge tank is filled by pumping liquid coolant into a flow surge loop 67 from the liquid coolant system by means of a recharging pump 71 upstream from the surge tank. Interposed between the surge tank and the recharging pump there is a check valve 75. Under normal, steady-state operation of the generator the contents of the surge tank will be held under high pressure, check valve 75 will be closed and recharging pump 71 will be shut down. The recharging pump will be automatically actuated by pressure sensor and actuator element 72 when the pressure in flow surge tank 65 falls below a preset initial level.

Liquid coolant from the flow surge tank is prevented from entering the liquid coolant system by means of a trip valve 79, located downstream from the flow surge tank and interposed between the liquid coolant system and the flow surge tank. The trip valve will close when the liquid coolant level falls below the low level shutoff loop 81.

The trip valve 79 will open in response to a valve actuator 85 which may typically be a solenoid operated mechanism responsive to an electrical signal. Three input signals a, b and c may be connected to the valve actuator.

Lead a electrically connects a temperature sensor 87 with the valve actuator. The temperature sensor may include a number of thermocouples arranged to sense the highest temperature in any of the stator bar liquid coolant system outlet hoses 27. This, in general, will give a temperature signal which is highly responsive to any transient increases in heating which occur within the liquid-cooled armature winding 22.

Lead b may electrically connect the valve actuator 85 with an armature current transformer 91 located at the phase winding terminals; or, any equivalent type of armature current sensor. In the event of an overload, a signal from the transformer will be sent to the valve actuator causing the trip valve to open.

Lead c is connected from the valve actuator to a timer 95 which may be set to operate the valve actuator at regular intervals to pulse purge the liquid coolant system. The timer may be used in combination with either the current responsive or heat responsive devices or in combination with both devices.

The operation of the invention is as follows. Under normal operating conditions, the valves 75 and 79 are closed while the valve 51 remains open. This permits liquid coolant to be pumped from the storage tank 39 through open check valve 51 into the dynamoelectric machine and from there to be recirculated back to the storage tank. Under these conditions, the gas coolant pressure exceeds the pressure at all points in the active liquid coolant circuit, the relationship maintained by the differential pressure regulator 55 in combination with the valve 59 and return loop 61. If any leaks in the liquid cooling circuit occur within the casing, gas will leak into the liquid, and this condition will be detected by the leak monitor and warning system.

If either the temperature sensor or the armature current sensor (armature current transformer) detects a dynamoelectric machine overload, it will signal the valve actuator 85 to open the trip valve 79 causing a flow surge of liquid coolant through the liquid coolant system. This will automatically close check valve 51 because the pressure head of the flow surge exceeds the pressure head of the normal liquid coolant flow. As soon as the liquid level in the flow surge tank falls below the level of shutoff loop 81, the trip valve 79 will close and permit valve 51 to reopen and restore the normal relationship of liquid coolant pressure to gas coolant pressure. Also, the normal action of the leak monitor and detection system will be resumed. The surge tank 65 will be refilled and pressurized to its appropriate level by the recharging pump 71 which will be automatically started during flow surge operation when the pressure in tank 65 drops below its prescribed level causing a liquid coolant flow through check valve 75 and the closing of valve 79. Pump 71 will shut down when the prescribed normal pressure level in tank 65 is achieved. The flow surge operation may be regularly programmed under normal conditions by setting the timer 95. This will regularly purge the liquid coolant system with a transiently increased flow which will act to sweep any foreign particles out of the system.

While there has been shown what is considered to be, at present, one preferred embodiment of this invention, it is, of course, understood that other modifications may be made therein. Such modifications may include the use of the present invention to provide a flow surge to a liquid-cooled generator rotor. It is intended to cover in the appended claims all such modifications which fall within the true spirit and scope of the invention.

What is claimed is:

1. In a dynamoelectric machine including an outer casing and electrically conductive dynamoelectric machine parts contained therein having a liquid coolant distributed therethrough; said dynamoelectric machine further including a liquid coolant system for circulating the liquid coolant through said dynamoelectric machine parts; and flow surge means for providing a temporary flow surge of liquid coolant to said liquid coolant system, said flow surge means including:

a surge tank, interconnected with said liquid coolant system and containing a supply of liquid coolant at a higher pressure than the liquid coolant pressure in said liquid coolant system;

a valve, downstream from said surge tank and positioned between said surge tank and said liquid coolant system; and, means for triggering said valve causing the liquid coolant in the surge tank to flow into said liquid coolant system in response to dynamoelectric machine overload conditions.

2. A dynamoelectric machine of the kind having a gas-tight outer casing which is supplied with a gas coolant therein and dynamoelectric machine parts within said gas-tight outer casing having a liquid coolant distributed therethrough, said dynamoelectric machine further including a liquid coolant system for circulating the liquid coolant through the dynamoelectric machine parts; and flow surge means for providing a temporary flow surge of liquid coolant to said liquid coolant system, said flow surge means including:
- a surge tank, interconnected with said liquid coolant system and containing a supply of liquid coolant at a higher pressure than the liquid coolant pressure in said liquid coolant system;
- a valve, downstream from said surge tank and positioned between said surge tank and said liquid coolant system; and,
- means for triggering said valve causing the liquid coolant in the surge tank to flow into said liquid coolant system.

3. The dynamoelectric machine as recited in claim 2 wherein the means for triggering said valve is responsive to dynamoelectric machine overload conditions.

4. The dynamoelectric machine as recited in claim 2 wherein teh means for triggering said valve is temperature responsive.

5. The dynamoelectric machine as recited in claim 4 wherein the temperature responsive means includes a thermocouple.

6. The dynamoelectric machine as recited in claim 2 wherein the means for triggering said valve is electrically responsive to armature current.

7. The dynamoelectric machine as recited in claim 2 wherein the means for triggering said valve is a timer.

8. The dynamoelectric machine as recited in claim 2 wherein the gas coolant is hydrogen.

9. The dynamoelectric machine as recited in claim 2 wherein the liquid coolant is water.

10. The dynamoelectric machine as recited in claim 2 wherein the liquid coolant system includes a storage tank, a pump, a heat exchanger and a check valve in series relationship with the liquid-cooled dynamoelectric machine parts.

11. The dynamoelectric machine as recited in claim 10 wherein the flow surge means is interconnected with the liquid coolant system between the check valve and the inlet end of the liquid-cooled dynamoelectric machine parts.

12. The dynamoelectric machine as recited in claim 2 wherein the highest pressure in the liquid coolant system, within the dynamoelectric machine, is less than the lowest pressure in the gas coolant system for steady-state operation whereby any leakage which occurs will be of gas coolant into the liquid coolant system.

13. The dynamoelectric machine as recited in claim 12 wherein any gas leakage will be detected by a gas monitor and detection device connected to said liquid coolant system.

14. The dynamoelectric machine as recited in claim 2 wherein the liquid-cooled parts include armature windings.

15. The dynamoelectric machine as recited in claim 2 where the liquid-cooled parts are stator core elements.

16. The dynamoelectric machine as recited in claim 2 wherein the flow surge means further includes an auxiliary pump and a valve interconnected with said liquid coolant system on the upstream side of said surge tank.

* * * * *